May 8, 1962 G. A. FEDDE ET AL 3,033,920

COLOR TELEVISION RECEIVER WITH RANDOM COLOR LINE SELECTOR

Filed July 14, 1958 4 Sheets-Sheet 1

INVENTORS
GEORGE A. FEDDE
RAMON H. AIRES
BY
Nelson E. Kimmelman
ATTORNEY.

May 8, 1962 G. A. FEDDE ET AL 3,033,920

COLOR TELEVISION RECEIVER WITH RANDOM COLOR LINE SELECTOR

Filed July 14, 1958

4 Sheets-Sheet 2

INVENTORS
GEORGE A. FEDDE
RAMON H. AIRES

BY Nelson E. Kimmelman

ATTORNEY

COLOR TELEVISION RECEIVER WITH RANDOM COLOR LINE SELECTOR

Filed July 14, 1958

INVENTORS
GEORGE A. FEDDE
RAMON H. AIRES
BY
Nelson E. Kimmelman
ATTORNEY

COLOR TELEVISION RECEIVER WITH RANDOM COLOR LINE SELECTOR

Filed July 14, 1958 4 Sheets-Sheet 4

INVENTORS
GEORGE A. FEDDE
RAMON H. AIRES
BY
Nelson E. Kimmelman
ATTORNEY

United States Patent Office 3,033,920

Patented May 8, 1962

3,033,920

COLOR TELEVISION RECEIVER WITH RANDOM COLOR LINE SELECTOR

George A. Fedde, Hatboro, and Ramon H. Aires, Levittown, Pa., assignors, by mesne assignments, to Philco Corporation, Philadelphia, Pa., a corporation of Delaware Filed July 14, 1958, Ser. No. 748,383
16 Claims. (Cl. 178—5.4)

This invention relates to cathode ray tube systems and in particular to systems for reproducing television pictures in color.

While not limited thereto, our invention is particularly applicable to color television receiving systems using certain types of cathode ray tubes which have an image-forming, beam-intercepting screen structure composed of a plurality of sets of parallel, elongated strips of phosphor materials. These strips are disposed either on the interior surface of the face plate of the tube proper, or on a separate planar support member of transparent material mounted within the tube envelope near the face plate. The strips of each of the sets are made of a different phosphor material. The phosphor materials chosen may be emissive of light in selected colors such as the three additive primary colors red, green and blue. These strips are disposed in a recurrent sequence on the screen structure, usually with a green emissive strip located between each red and blue emissive strip.

The cathode ray tube is conventionally equipped with an electron gun for projecting an electron beam toward the screen. In addition, there is disposed between the gun and the screen structure a grid of deflecting wires parallel to the phosphor strips of the screen, alternate ones of these wires being electrically connected together. The cathode ray tube is also equipped with conventional means for deflecting the electron beam over the entire screen area in a plurality of spaced paths. In one mode of operation of this tube the beam may be deflected substantially only *between* different adjacent ones of the wires of the grid. In another mode of operation, the beam may be so deflected as to impinge *on* one or more of the wires in one or more of its scanning paths. During the scanning of the beam in each path, one line of the image which corresponds to one line of the scene being televised by the camera is reproduced.

In addition to deflecting the beam in a plurality of spaced paths, whereby the individual lines of the image are produced, the beam is also deflected, during the scanning of each line, either upward or downward so as to impinge upon strips emissive of predetermined colors by means of a varying differenceetaoishrdlcetaoe colors by means of a varying difference in potential applied between adjacent ones of the wires of the grid. In step with the deflection of the beam upwards or downwards (so as to impinge on strips of predetermined colors), the intensity of the beam is modulated by signals repreresentative of the colors of elemnts of the televised scene which correspond to the colors emitted by the strips upon which the beam contemporaneously impinges.

It is known to vary the potential applied to the adjacent wires of the grid in accordance with a sinusoidally varying voltage wave having a very high frequency which causes the electron beam to be deflected upward or downward. Thus the beam traces a sinusoidal path at 3.6 mc. while scanning each line of the image and impinges on phosphor strips emissive of colors in the following regular, repetitive sequence: blue, green, red, green, blue, green, red, green, etc. During each cycle of the sinusoidal path the green emissive strip is ordinarily impinged upon twice by the beam and the beam traverses the green emissive strip during intervals which are only half as long as the intervals in which it traverses the red and blue emissive strips.

In this known mode of operation the intensity of the beam is modulated by signals derived from the standard United States broadcast color television signals. The beam intensity is therefore modulated by signals representative of the red and blue information in the scene televised during intervals which occur at a rate of approximately 3.6 mc. corresponding to the intervals in which the beam impinges upon red and blue emissive phosphor strips, and by signals representative of the green information during intervals which occur at a rate of approximately 7.2 mc. (i.e, twice the frequency of the color sub-carrier of the standard broadcast signals) corresponding to the intervals in which the beam inpinges upon the green strips.

A practical screen structure for such a tube may be 12 inches high and 16 inches wide and may comprise approximately 1200 phosphor strips and 600 grid wires. Since these wires are disposed close to one another and to the phosphor screen structure, the entire grid will present a very low impedance to the source of grid switching voltage. Consequently, in the conventional operation of such a tube, a large quantity of power to drive the grid will be required from the grid switching source. It is expensive to construct a grid switching source which will deliver the large amount of power required. Also, switching the potential on the grid wires at the color subcarrier frequency or multiples thereof causes undesirable radiation of signals which are troublesome because they tend to interfere with the proper operation of the other circuits of the receiver.

In order to reduce the power requirements and the undesirable radiation associated with systems employing the aforementioned tube which switch the potential on the grid at a very high rate, it has hitherto been proposed to scan each line o fthe image so as to produce information of only one of the taking primaries therein, i.e., to use the tube in a so-called "line-sequential" manner. In other words, the first line of the field contains only red information, for example, the second line blue information, the third line green information, and so on in regularly recurrent sequence. Thus it is necessary to switch the potential on the wires of the grid only at the conventional horizontal line scanning rate, i.e., 15,750 c.p.s. This method of operation, of course, reduces the power requirements and minimizes the radiation of spurious signals from the grid of wires. However, there is a certain amount of loss of resolution in the horizontal direction as compared with the horizontal resolution of systems in which the color sequence is switched at an element rate. Even more serious, "line crawl," a visual phenomenon present in most line-sequential systems, occurs. Line crawl has hitherto been one of the most serious objections to line-sequential systems in which the reproduced image is scanned in different colors in a regular, repetitive sequence. Line crawl is caused by the tendency of the eye to move automatically from a line scanned in a particular color to the next regular space where the next line is scanned in that color. This phenomenon causes visual confusion inasmuch as the eye tends to travel in the direction of the successive displacements of the lines scanned. Thus the observer sees lines of any one color as apparently moving in a vertical direction. So long as the scanning of colors is in a regular, repetitive sequence, line crawl will continue to be a serious drawback of line sequential systems for color television image reproduction.

One object of the invention is to provide systems for the reproduction of color television images using cathode ray display tubes of the type described which are more efficient and less expensive than conventional systems using such tubes.

Another object of the invention is to reduce the power required to operate the beam-controlling elements of a cathode ray tube of the type described.

Still another object of the invention is to provide color television receiving systems which employ cathode ray tubes of the type described in which radiation of spurious signals from the wire grid is practically eliminated.

Another object of the invention is to provide a color television receiving system of the line sequential type which is free from line crawl.

The present invention is based on the premise that it is desirable and feasible to operate cathode ray tubes of the type described in a line-sequential fashion and on the additional premise that color television line-sequential display systems can be made visually satisfactory if the scanning of colors is not done in a regular, repetitive sequence. Accordingly, we provide apparatus for switching the voltage on the wire grid from one level to another at a very low frequency, namely, at the conventional line scanning frequency or submultiple thereof. The beam is therefore so deflected that it traverses only one phosphor strip in the course of each of its scanning paths. By thus reducing the frequency at which the wire grid is switched, power losses due to the high value of capacitance of the wire grid are greatly diminished, and radiation of spurious signals therefrom is practically non-existent.

In accordance with our invention we also construct the apparatus for switching the voltage on the grid so that the beam traverses in successive scanning paths phosphor strips emissive of colors which occur in an essentially random sequence rather than in a regular, repetitive sequence. In this way line crawl is not permitted to become evident in the reproduced image.

In a preferred form of the invention the potentials applied to the wire grid are switched at only half the conventional line frequency. This reduces the power requirements and the radiation of spurious signals in the system even more than is the case when the potential in the grids is switched at the conventional line scanning frequency.

Furthermore we have found that, in this preferred form of the invention, the peak power requirements of the system may be materially reduced if the time allotted for switching the grid from one voltage level to another is not confined, as in conventional line-sequential operation of such tubes, to the horizontal retrace period but rather is spread out over a period of time more on the order of a conventional line scanning interval. We therefore provide in this preferred form, for reproducing only the information contained in the incoming signals corresponding to the scanning of alternate lines of the scene being televised. The reproduction of information in the signals during intervals in which intervening lines are scanned by the camera is accordingly omitted by blanking the beam during those intervals. In the latter intervening line intervals we provide, in the preferred form of our invention, for switching the potential applied to the wire grid very gradually from the level obtaining when the previous alternate line of the image was scanned to the level which is to obtain during the next succeeding alternate line interval. This results in a considerable reduction in the peak power required to switch the grid and permits the use of less expensive circuit components. Although blanking the beam during the intervening line intervals reduces the total number of lines constituting the reproduced image and thereby reduces the vertical resolution somewhat, the loss of some vertical detail is not really so great as it would seem since in any two successive lines of any field there is a great amount of redundant information. Besides, the additional reduction in peak power requirements far outweighs any possible disadvantages occurring from the omission of alternate lines.

The operation of the apparatus constructed in accordance with the preferred form of our invention may be summarized substantially as follows: During a first conventional line scanning interval the wires of the grid are maintained at a first voltage level causing the beam to traverse just one phosphor strip emissive of a first color, the beam being modulated by signals representative of that color. During the second conventional line scanning interval the grid potential is gradually switched from the first voltage level to a second voltage level while the beam is cut off. During the third line scanning interval the grid is maintained at the second voltage level causing the beam to traverse a strip emissive of a second color, the beam being modulated by signals representative of the second color. In the succeeding alternate line intervals the beam traverses phosphor strips emissive of different colors in response thereto, the sequence of the colors scanned being random so that line crawl is not visible.

Figure 1:
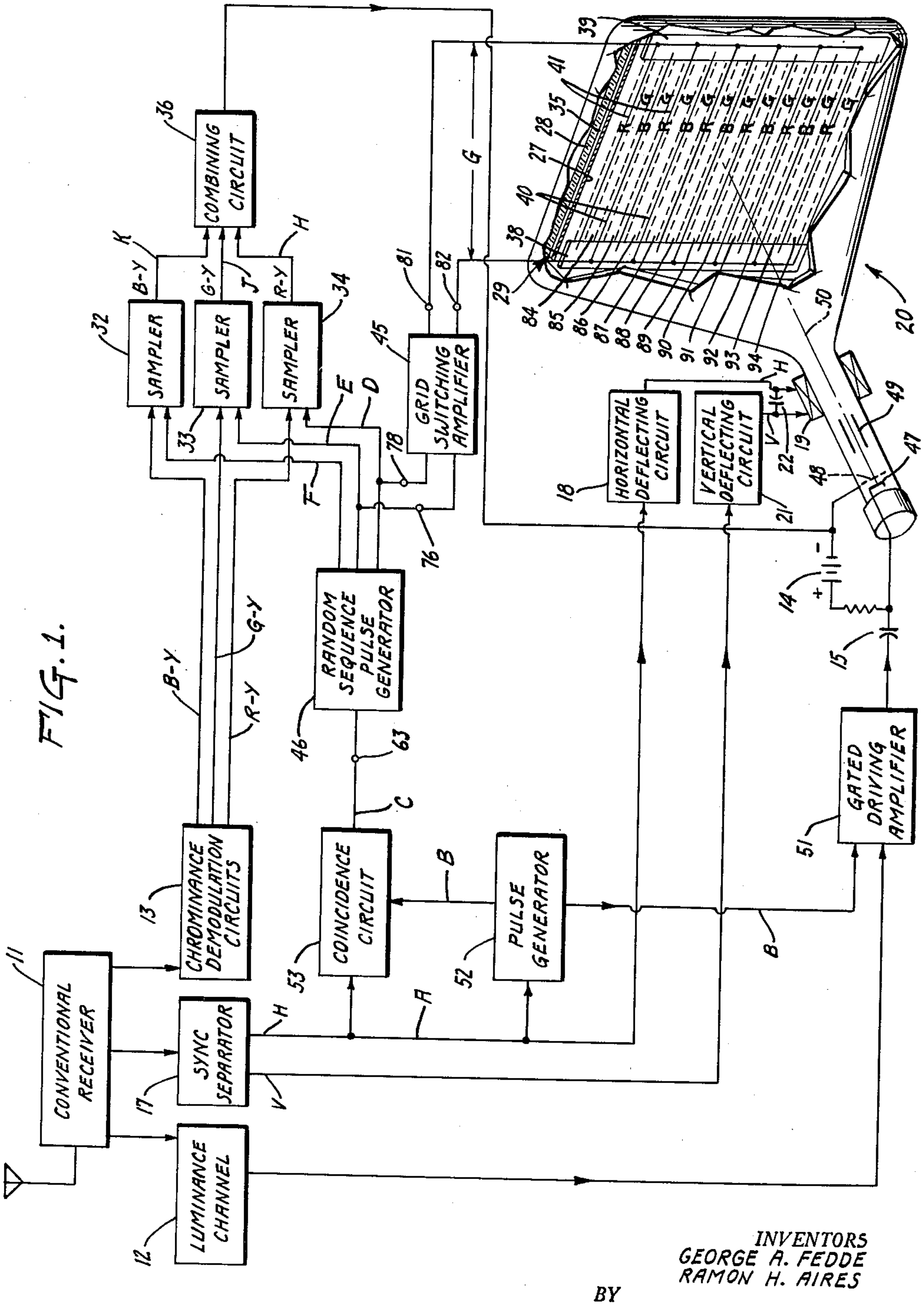
FIGURE 1 is a block and schematic diagram of one form of a color television image-reproducing system in accordance with my invention.

Referring to FIGURE 1, there is shown a conventional color television cathode ray display tube 20, of the sort hereinbefore mentioned, having a cathode 47, a control grid 48, and a focussing electrode 49. These electrodes cooperate to produce a beam 50 which falls upon a beam-intercepting structure 29 located either in contact with, or in proximity to, the inner surface of the faceplate of the tube 20. The beam-intercepting structure 29 includes a layer 35 comprising a number of sets of phosphor strips which emit red, green, and blue light respectively in response to the impingement of electrons thereupon. The strips are deposited in contact with an appropriate transparent substrate 28 located near said inner surface (as shown), or with the inner surface of the faceplate of tube 20. In back of the layer 35 of phosphor strips is a light-reflecting and electron-permeable layer 27 which may be of aluminum, for example, which helps to increase the brightness of the image produced by the tube 20, and prevents "ion spot," that is, a discoloration the phosphor screen due to the impact of ions thereupon.

The tube 20 also contains two sets of parallel wires 40 and 41 respectively which are interleaved with one another and are suspended between the supporting members 38 and 39 intermediate the electron gun and the beam-intercepting structure 29. Further details of such a tube and its associated circuitry may be found in the January 1954 issue of "Proceedings of the I.R.E." in an article beginning at p. 308.

Also shown as block 11 is a conventional color television receiver which may include the customary R.F., mixer, I.F., and second detector stages. A conventional sync separator 17 is coupled to the second detector stage of the conventional receiver 11 and separates both the horizontal and vertical synchronizing pulses from the detected incoming signals. The separated horizontal and vertical synchronizing pulses are applied to trigger conventional horizontal and vertical deflecting circuits 18 and 21 respectively which deflect the electron beam in a pattern like that of a conventional monochrome television receiver comprising a number of paths substantially parallel to wires 40 and 41.

In accordance with the invention it is desired further to deflect the beam vertically so as to cause it, during alternate ones of the aforementioned line scanning intervals, to traverse just one color emissive phosphor strip. Moreover, during successive ones of the alternate line intervals it is desired that the colors emitted by the impingement of the beam on the phosphor strips occur in an essentially random sequence. During intervening line intervals it is desired gradually to alter the deflection of the beam from the condition which existed during the immediately preceding alternate line interval to a different condition which is to obtain the next succeeding alternate line interval. This is accomplished by the application of appropriate auxiliary deflecting potentials to the wires 40 and 41.

To this end horizontal synchronizing pulses (Curve A, FIG. 2) from the sync separator 17 are applied to trigger the pulse generator 52 which produces pulses (curve B, FIG. 2) having a duration equal to one line interval and which occur at half the conventional horizontal line scanning frequency. These pulses are applied to a conventional coincidence circuit 53 together with the horizontal synchronizing pulses from separator 17. Whenever pulses from both of these sets occur simultaneously in the inputs of circuit 53, short keying pulses (curve C, FIG 2) having a width which is the same as the horizontal synch pulses (curve A), but having a frequency which is just half that of the horizontal sync pulses, are generated. These keying pulses are applied to trigger the random sequence pulse generator 46, which device is described in more detail hereinafter with reference to FIG. 3. In response to the application of the keying pulses to generator 46, the latter produces three sets of pulses (curves D, E, and F, FIG. 2) which fulfill the following requirements. First, each pulse has a width corresponding to the duration of two lines. Second, each pulse commences in response to the trailing edge of each keying pulse. Third, in each set of pulses, no pulse is produced immediately after the preceding pulse. Fourth, the pulses in each set do not occur in a regular repetitive sequence. Fifth, no pulses of any one set overlaps, in time, the pulses of any other set. Sixth, in each succeeding interval of two lines' duration a pulse is produced in one of the three sets. Finally, pulses are produced in the three different sets in essentially random order.

Two of these three sets of pulses are applied to trigger the grid switching amplifier 45, which device is described in more detail hereinafter with reference to FIG. 4. Briefly, however, grid switching amplifier 45 is so constructed that, if a pulse is supplied to it by a terminal 76 and no pulse is supplied to it by a terminal 78, no difference in potential will exist between its output terminals 81 and 82. However, if a pulse is supplied to it by a terminal 78, and no pulse is supplied by a terminal 76, terminal 81 is driven positive by a predetermined amount with reference to terminal 82. On the other hand, if no pulses are applied by either of terminals 76 and 78, terminal 82 is driven positive by a like amount with reference to terminal 81.

As will be recalled, the pulses applied to grid switching amplifier 45 each have two lines' duration, occur in random sequence and otherwise fulfill the aforementioned seven conditions. The effect of the operation of amplifier 45 in response to the pulses applied thereto is as follows: During the interval in which the beam 50 is scanning the first line it will be deflected by wires 40 and 41 which are at a first potential level so that it scans along a strip emissive of a first color. In the second line interval, during which the beam in conventional line-sequential operation would ordinarily scan the next line of the raster, the potential on the wires 40 and 41 is slowly changed from the first level to a second level by amplifier 45 and the beam 50 is blanked. In the third line interval the potential on the wires 40 and 41 remains at the second level so that the beam scans the second line along a phosphor strip emissive of a second color. During the fourth line interval (in which the beam is again blanked) the potential on the wires 40 and 41 again is changed slowly to another level. During the fifth line interval the beam scans the third line along a phosphor strip emissive of a third color. The colors scanned in successive alternate lines occur in a random sequence as a result of the potentials applied to the wires 40 and 41 by the amplifier 45.

As the beam 50 scans along the phosphor strips emissive of different colors, its intensity is modulated in synchronism therewith by signals representative of the color of light emitted by the strip being scanned. In the apparatus of FIG. 1 the beam is modulated by the combined effect of the application of appropriate sampled color difference signals to electrode 48 and of the application of the luminance signal to the cathode 47. This synchronism is attained by having the random sequence pulse generator 46 govern the order of sampling of the color difference signals in the samplers 32, 33 and 34 in step with the switching of the potential on the wires 40 and 41 by the amplifier 45.

The color representative voltage waves, which in the case illustrated are the color difference signals, $R-Y$, $B-Y$ and $G-Y$, are supplied to the samplers 32, 33 and 34 from conventional chrominance demodulation circuits 13 which may be, for example, of the cathode-coupled, high level type described in May 1955 issue of "Radio-Electronics" on page 32, et seq. As stated before, the random sequence pulse generator produces three sets of pulses (curves D, E, F), each pulse having two lines' duration. These three sets of pulses, when applied to the samplers 32, 33 and 34 cause different ones of them to conduct in random sequence. When they conduct they produce output waves consisting of pulses of essentially rectangular shape having two lines' duration (curves H, J and K, FIG. 2) which are modulated in amplitude by the $B-Y$, $G-Y$, and $R-Y$ signals respectively. These output waves are added together in the combining circuit 36 and applied to the control electrode 48 where they, together with the Y signal variations on the cathode, modulate the intensity of the beam 50. It should be noted that, although the pulses applied to the electrode have a duration of two lines, only half of the pulse width (unshaded portions of curves H, J and K) is actually used to modulate the beam because the beam is blanked during intervening line intervals.

As has been stated before, during the intervals between the scanning of alternate lines, the beam 50 is cut off to allow the potential on the wires 40 and 41 to be gradually changed from one level to another in response to the action of the grid switching amplifier 45, thereby reducing the peak power requirements of the grid switching amplifier. If the beam were not blanked during intervening line intervals it would tranverse more than one phosphor strip during the course of each of said intervals. Thus, if it were desired to reproduce information during the intervening intervals, a complex system would be required for modulating the beam by signals representative of the colors of light emitted by the several strips traversed in each such interval. To simplify the system the beam is blanked by the operation of the bias battery 14 in conjunction with the operation of the gated driving amplifier 51. When the amplifier 51 is non-conductive the cathode is maintained at a positive potential supplied by battery 14 such that no beam current will flow in the tube 20. Only when the gated amplifier 51 is conductive is the luminance signal applied to the cathode 47 from the conventional luminance signal channel 12 which is connected to the second detector portion of the conventional receiver 11. The luminance channel 12 may comprise conventional video amplifiers and a conventional delay line.

The gated amplifier 51 is rendered alternately conductive and non-conductive by gatting pulses supplied thereto from the pulse generator 52. These pulses occur at half the conventional line scanning frequency and have a width corresponding to the duration of one line. They are the same pulses (curve B) which are applied to the coincidence circuit 53 from generator 52. When they reach a predetermined positive amplitude level they cause the amplifier 51 to conduct so that the output signal thereof will be a negative pulse, modulated in amplitude by the Y or luminance signal, which has sufficient negative magnitude to override the positive bias on electrode 47. The pulsed Y signal on the cathode 47 and the pulsed color difference signal on the electrode 48 combine to modulate the beam 50. Although color difference signals from circuit 36 are continuously applied to the electrode 48 in the form of successive amplitude (color difference signal) modulated pulses having two lines' duration, only one half of the width of each of the latter pulses is effective to modulate the beam since the beam is "on" only during alternate line intervals.

Figure 2:
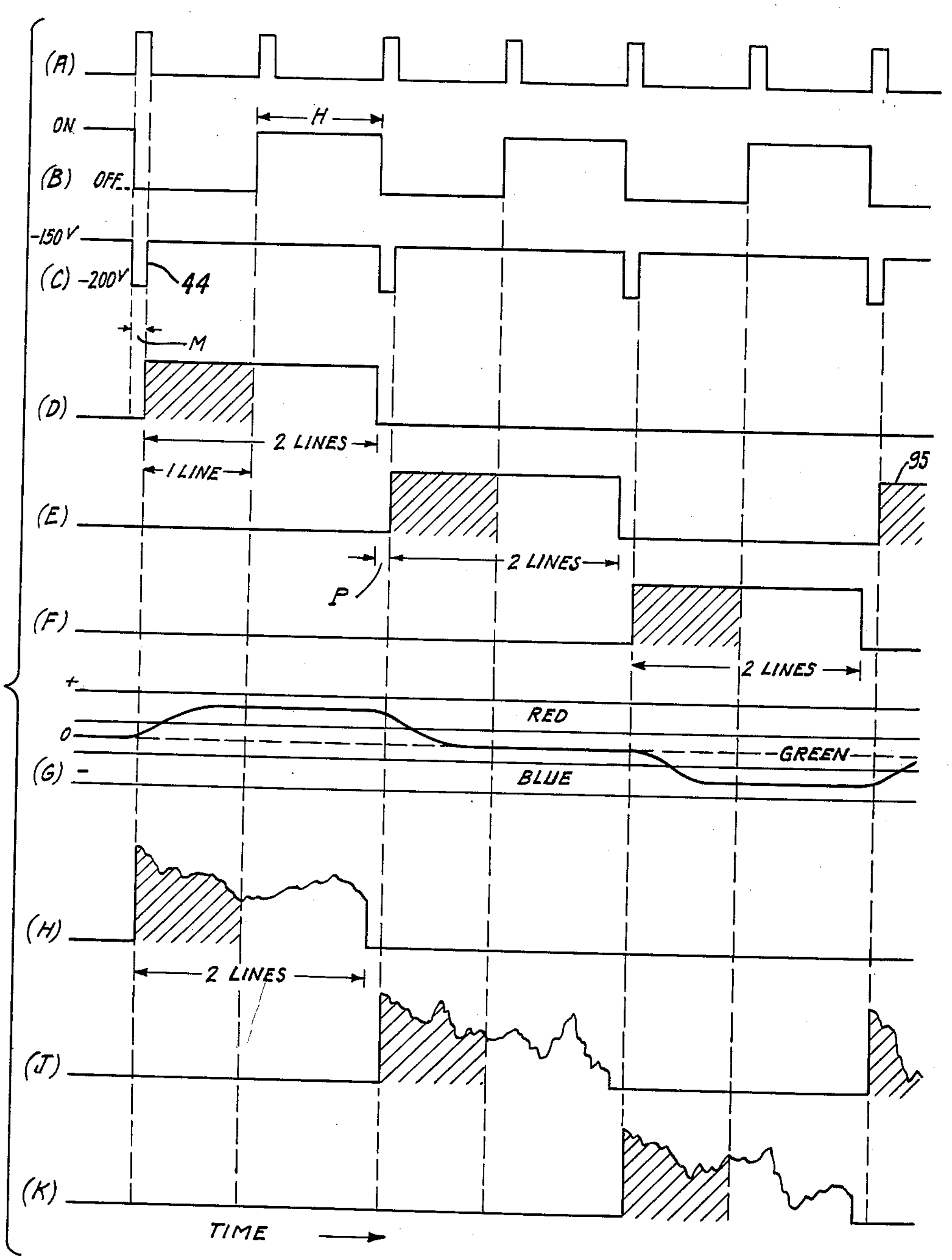
FIGURE 2 is a group of waveforms showing operating conditions at various points in the apparatus shown in FIGURE 1.

FIGURE 2, which shows the waveforms of signals at various points in the system illustrated in FIGURE 1, will now be explained in more detail. Points in FIG. 1 at which the signals having the waveforms shown in FIG. 2 appear are lettered corresponding to the letter denoting a particular waveform in FIG. 2. Conventional horizontal synchronizing pulses (waveform A) from the sync separator 17 are applied to the coincidence circuit 53 and to the pulse generator 52. The pulse generator 52 is so constructed that it produces, in response to the application of the leading edges of the horizontal sync pulses thereto, a series of pulses (waveform B) which have a duration of one conventional scanning line. These pulses (waveform B) are applied to the coincidence circuit 53. Whenever the trailing edges of the positive-going pulses (waveform B) coincide with the leading edges of the horizontal sync pulses (waveform A) in the inputs to the coincidence circuit 53, the latter begins the production of one of the narrow keying pulses 44 (waveform C) which appear in its output circuit. These pulses 44 have a duration corresponding to the interval denoted by the leter M in FIG. 2. This interval is equal to the width of the horizontal synchronizing pulses (waveform A) and is the interval in which the maximum positive excursion of wave A coincides, in the inputs of circuit 53, with the maximum negative excursion of wave B. These narrow pulses (waveform C) are applied to key the random sequence pulse generator 46 which produces three sets of rectangular output pulses having the waveforms D, E and F in response thereto. Each of the pulses in each set is initiated in response to the trailing edges of particular ones of the keying pulses 44 shown in waveform C. It will be noted that waveforms D, E, and F consist of pulses having approximately two lines' duration.

Two of the three sets of pulses, i.e., those shown in waveforms D and E are applied via terminals 78 and 76 respectively to the grid switching amplifier 45 which produces a varying potential on the wires 40 and 41 of the post-deflection grid of wires 40 and 41. The varying potential on the grid causes the beam 50 to be deflected in a vertical direction during each of its horizontal scanning paths. The amplifier 45 is so constructed that if signals having the waveform E are applied thereto via terminal 76, the potential on both sets of the wires of the grid will be the same. When the potential on both sets of wires is the same the beam 50 is not deflected vertically and the beam will consequently scan the green emissive phosphor strips which are located intermediate adjacent ones of the wires. When signals having the waveform D are applied via terminal 78 to the amplifier 45, the amplifier causes the wires 41 to be driven positive by a predetermined amount with reference to the potential on the wires 40. The beam 50 is thus caused, after passing through the wires, to be deflected upwards and to impinge upon red emissive phosphor strips as it is deflected along its scanning paths on the screen of the tube 20. If neither of the signals having waveforms D and E are applied to the amplifier 45 via either one of the input terminals thereof, the latter is so constructed that it causes the potential on the wires 40 to be positive with respect to the potential on the wires 41. When this occurs the beam 50 is deflected downwards in the region of the grid so that it scans blue emissive phosphor strips in each scanning path. It will be noted that each of the pulses of waveforms D and E has a duration of two scanning lines so that it would appear that two successive scanning lines of the image would be scanned along phosphor strips emissive of the same color. However, as has been previously remarked, in a preferred form of our invention the beam is blanked during alternate line scanning intervals.

The A.-C. component of the variations in the potential existing across the terminals 81 and 82 (and hence across the sets of wires 40 and 41) at "G" are shown in the waveform G which is plotted so that points thereon are relative to the traversal of the beam 50 on phosphor strips emissive of the three primary colors. It will be seen that the potential shown in waveform G changes from a zero level marked in dashed lines to a more positive voltage during part of the first line interval. Toward the middle of the first line interval the curve G levels off at a value of voltage at which it remains during the balance of the first line interval and during most of the second line interval. At the end of the second line interval (i.e., beginning at a time corresponding to the occurrence of the trailing edge of the positive pulse in waveform D) the potential across G decreases slowly until it reaches the zero reference level approximately at the middle of the third line scanning interval, at which level it remains until the leading edge of the first pulse in the waveform F occurs. At this time the potential across G reverses in polarity since neither a pulse of a waveform D nor of waveform E is applied to the grid switching amplifier 45. It gradually changes in voltage until, at about the middle of the fifth line interval, it becomes stabilized at a level at which it remains until the end of the sixth line scanning interval (i.e., when the leading edge of pulse 95 of waveform E occurs) whereupon it once again begins to rise until it reaches the zero reference potential.

It will be seen that if the beam is not blanked during alternate line scanning periods the transitions of the voltage level across G would cause the beam to scan, during the first line interval say, along a green emissive phosphor strip and then along a red emissive phosphor strip toward the end of that interval. If the beam 50 scans more than one phosphor strip during each line interval the beam would have to be modulated with signals corresponding to the strip being traversed to avoid loss of color fidelity. As may be seen by examination of waveform G, this would mean that the beam would have to be modulated twice during the first line interval, first by signals representative of green information and then by signals representative of red information. During the third line scanning interval the beam would also have to be modulated twice, first by signals representative of red information and then by signals representative of green information. In the second, fourth, etc., line scanning intervals it would be necessary to modulate the beam with intelligence representative of only one color since during those intervals only one phosphor strip is traversed by the beam.

It is, of course, possible to change the voltage G across terminals 81—82 during the horizontal retrace interval indicated by the letter P in waveform E. However this would require a rather abrupt decrease in voltage from the level prevailing during the second line scanning interval to the level which is to prevail during the third line scanning interval, and would thus necessitate a relatively large peak power capacity in the grid driving amplifier 45. It has therefore been found expedient to change the potential G gradually during alternate ones of the line scanning intervals so as to keep the peak power requirements of the system small and so as to obviate the need for a non-periodic system of modulating the beam.

In order to prevent the scanning of the screen during alternate line scanning intervals, the beam is blanked or cut off in the manner now to be described. It will be recalled that the pulse generator 52 produces output signals having waveform B which comprise a series of pulses which occur at half the line scanning frequency. The waveform B indicates that the most negative portions thereof occur during alternate line intervals. The pulses having waveform B are applied from generator 52 to one input of the gated driving amplifier 51 to which the luminance signal from the luminance channel 12 is also applied. When pulses having the waveform B are at the amplitude level marked "off" in waveform B, the amplifier 51 is rendered non-conductive and the cathode is maintained positive with respect to the control grid 48 so that no beam current flows in the tube 20. When the pulses having the waveform B are at the amplitude level marked "on," the amplifier 51 is rendered conductive so that the luminance signal appears in the output of the latter as a negative pulse having a duration of one line interval which is modulated in amplitude by the luminance signal. This amplitude-modulated negative pulse is sufficiently negative to override the positive bias supplied by the battery 14 to the cathode 47. As a result the pulsed Y signal on the cathode 47 and the pulsed color difference signal on the control grid 48 combine to modulate the beam 50 with information corresponding to the color of the elements scanned.

It has been shown that two of the three signals having waveforms D, E and F are used to cause the grid switching amplifier 45 to vary the potential existing between the wires 40 and 41 so that the beam will traverse phosphor strips of only one color during each of its scanning paths. It is therefore required that the beam be modulated with information corresponding to the color emitted by the particular phosphor strip traversed by the beam in each scanning path. This is accomplished by also using the series of pulses D, E, and F to control the sampling action in the samplers 32, 33 and 34 in the following manner. The signals having waveforms D, E, and F are applied to one input of the circuits 32, 33 and 34 to which the color difference signals $B-Y$, $G-Y$, and $R-Y$ are respectively applied. Thus, during the first two-line scanning interval the pulse shown in waveform D causes the sampler 32 to conduct so that in the output of the latter a pulsed sample of the $B-Y$ color difference signal appears as shown in waveform H which has a duration of two lines. During the next two-line scanning interval the first pulse shown in waveform E is applied to the sampler 33 causing the production in the output circuit of the latter of an amplitude modulated pulse having a duration of two lines as shown in waveform J. During the third two-line scanning interval the pulse shown in waveform F is applied to sampler 34 causing the latter to produce the amplitude modulated pulse which contains $R-Y$ information as shown in waveform K.

Many of the components represented schematically by the blocks of FIG. 1 are well-known conventional circuits. For example the pulse generator 52 may comprise a conventional Eccles-Jordan type of triggered circuit which conducts on the application thereto of alternate horizontal synchronizing pulses (waveform A) from the separator 17, and which is cut off by the application thereto of the intervening horizontal synchronizing pulses. The coincidence circuit 53 may be any of a number of well-known coincidence circuits and therefore no further description is believed necessary.

Figure 3:
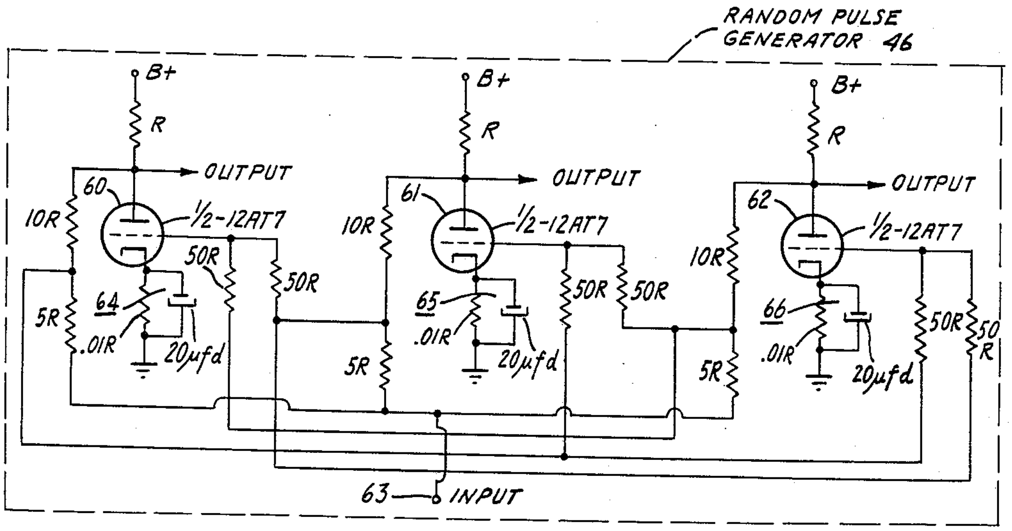
FIGURE 3 is a circuit diagram of the random sequence pulse generator shown in block form in FIGURE 1.

While any pulse generator may be used as the pulse generator 46 if it produces pulses having characteristics which fulfill the seven conditions listed previously in the overall explanation of FIG. 1, we have found that our novel circuit shown in FIG. 3 very satisfactorily accomplishes this purpose. The circuit of FIG. 3 comprises three triodes 60, 61, and 62 each of which may be half of a 12AT7, for example. Each of the triodes includes a resistive voltage-dividing circuit between B+ and the terminal 63. The plate of tube 60 is coupled to the respective grids of tubes 61 and 62 and to the voltage-dividing circuit of the tube 60. Similarly the plates of tubes 61 and 62 are respectively coupled to the grid circuits of the other two tubes. With tubes such as 12AT7's and with the voltage dividing network for each tube having the values of resistance shown ($R\approx22K$ ohms), the circuit constants are so set up that when the potential of the terminal 63 is at $-150$ volts only one of the three tubes will conduct, the current flow through the conducting tube causing the voltage on the grids of the other tubes to drop to a point which cuts them off.

The circuit of FIG. 3 commences operation because of the fact that the tubes 60, 61, and 62 are not exactly matched, and therefore when the potential at terminal 63 is at $-150$ volts, one of the tubes will begin to conduct earlier than the others, thereby cutting the others off. When the potential at the terminal 63 drops from $-150$ volts to $-200$ volts (waveform C) the circuit constants are such that all tubes are cut off.

The cathode RC circuits 64, 65, and 66 have a very long time-constant compared to the period of the signal wave used in the sampling operation, i.e., long compared to the time required to scan several lines. These respective RC circuits play an important part in the operation of the circuit of FIG. 3 and perform a number of different functions. For example, if tube 60 is conducting and the keying pulses cause the voltage at terminal 63 to go to $-200$ volts all of the tubes are cut off. Because of the long time-constant of the RC circuit 64 the potential on the cathode of tube 60, just after the latter has been conductive, is more positive with respect to ground than the potential on the cathodes of tubes 61 and 62. Thus the tube 60 will be held cut off for some time and another tube will conduct, which prevents the scanning of a strip emissive of the same color as the previously scanned strip. The RC circuits also act to maintain equal average current in each tube and an equal average number of pulses from each tube.

As stated above, two of the three sets of pulses produced by generator 46, i.e., those shown in waveforms D and E of FIG. 2, are also applied to trigger the grid-switching amplifier 45. The latter energizes wires 40 and 41 thereby deflecting the beam 50 so that it scans phosphor strips emissive of colors corresponding to those which the signal wave on the control grid 48 then represents.

Figure 4:
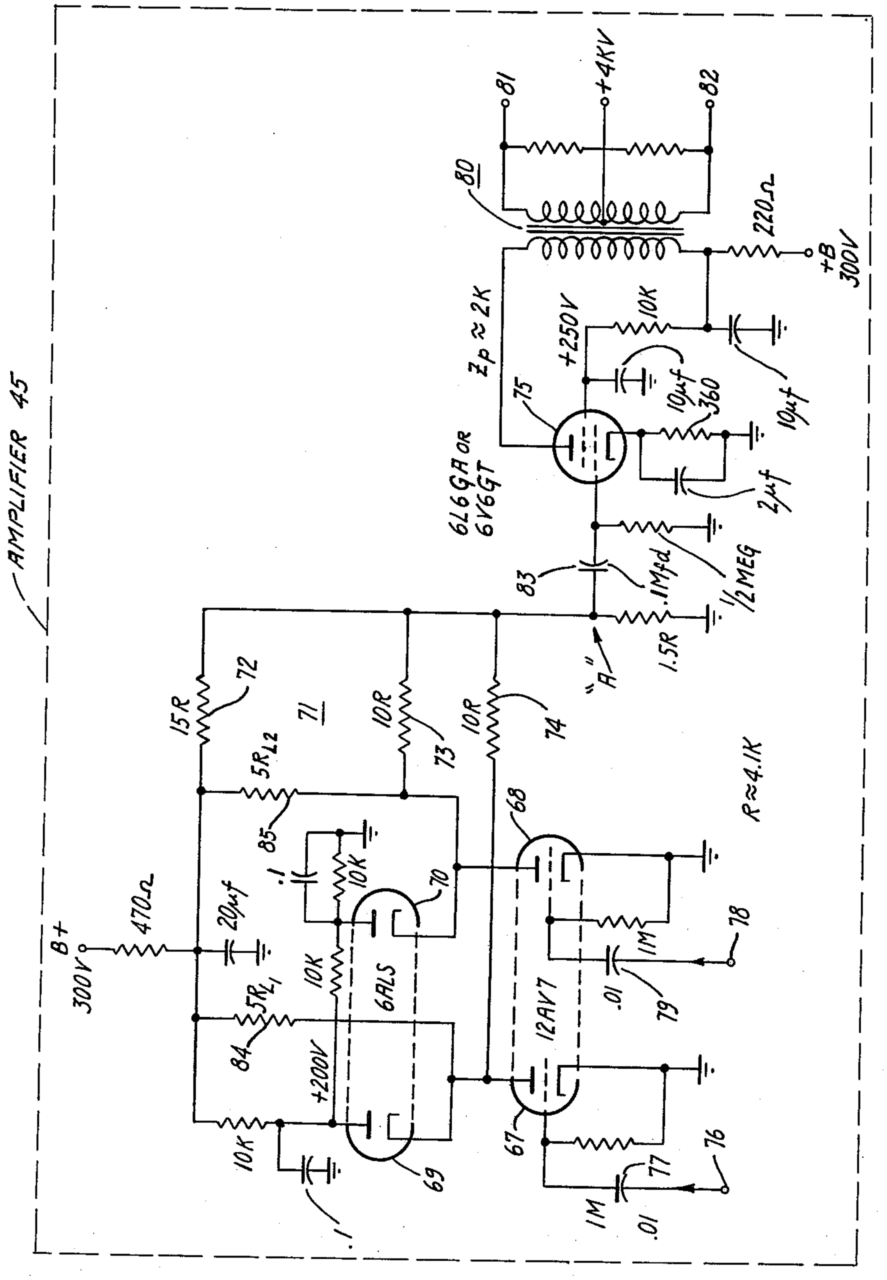
FIGURE 4 is a circuit diagram of the grid switching amplifier shown in block form in FIGURE 1.

In FIGURE 4 a schematic diagram is shown of a novel grid switching amplifier which we have invented which may be used very effectively as the amplifier 45 in the system shown in FIG. 1, although it should be understood that other amplifiers producing substantially the same results can alternatively be used. The circuit of FIG. 4 is designed to be used either with two of the output circuits of a three-channel random sequence pulse generator such as generator 46, or with a random sequence pulse generator which only has two output channels. The former arrangement is the one actually used in the system shown in FIG. 1. The amplifier of FIG. 4 is designed to produce two conditions of voltage at its output terminals 81 and 82 corresponding to the occurrence either of pulses of the series shown in waveforms D or the series shown in waveform E, and to produce a third condition of voltage in the absence of pulses of either of the last-named series. Specifically, referring to FIG. 2, the amplifier 45 is designed to develop the voltage wave G in response to the application, to the amplifier, of input signals D and E.

In a display tube having the general construction of tube 10 shown in FIG. 1, a practical value of the potential applied to wires 40 and 41 for deflecting the beam 50 upward or downward so as to scan either the red or the blue phosphor strips of the beam-intercepting structure is 4 kv.±800 volts. It is desirable to maintain the entire grid at the same average potential, and to obtain a push-pull drive of the grid wires 40 and 41 from a single-ended output stage, so the circuit of FIG. 4 includes a 1:4 step-up transformer 80 whose secondary is center-tapped and connected to a source of +4 kv.

The circuit of FIG. 4 also includes two amplifying tubes 67 and 68 whose plates are clamped at +200 v. and +100 v. respectively by the diodes 69 and 70 respectively when the tubes 67 and 68 conduct. There is a resistance matrix unit 71 connected to B+ consisting of the resistances 72, 73 and 74 which have a common junction at point "A." The circuit is so set up that the potential at point "A" will either be +75, +65, or +55 volts depending upon whether either or both of the tubes 67 and 68 are cut off. When they are both cut off, the potential at point "A" will be +65 volts. Because of the coupling capacitor 83 intermediate point "A" and the grid of tube 75, only the A.-C. component of the voltage change at point "A" will be transmitted to the latter tube. Thus the potential on the grid of tube 75 will fluctuate from +10 volts to −10 volts about its A.-C. axis as the potential at point "A" varies between +75 and +55 volts. When the grid of tube 75 is at 0 volt A.-C. (i.e., when point "A" is +65 v.), the tube 75 operates at its steady-state current condition so that the current through the primary winding of the transformer 80 does not induce any voltage in the secondary thereof. When no voltage is induced in the secondary the potential at both terminals 81 and 82 will be 4 kv. so that the wires 41 and 40 coupled thereto respectively will be at the same value of potential, and the beam 50 will be caused to impinge upon a green phosphor strip.

The operation of the circuit of FIG. 4 will now be described in more detail. When the pulse generator 46 generates pulses as shown in waveform E of FIG. 2, the $G-Y$ color difference signal wave will be sampled in response thereto in the sampler 33. The same pulses are also applied to the grid of the triode 67 via the terminal 76 and the coupling capacitor 77. This causes the triode 67 to conduct so that the potential on its plate will decrease making the cathode of the clamping diode 69 more negative and thereby causing it to conduct. When the diode 69 conducts it clamps the potential of the plate of the tube 67 to +200 volts. Current from B+ also flows through the resistance 72 and the resistances 85 and 73 in series. This results in the production of +65 volts at point "A," 0 volt A.-C. at the grid of tube 75 (because the latter is in a steady state of conduction as explained previously), and equal potentials at the terminals 81 and 82 which are coupled to the wires 41 and 40 respectively.

When the pulses illustrated in waveform D of FIG. 2 (which are used to sample the $R-Y$ signal in sampler 34) are produced by generator 46 and are received by the switching amplifier 45, via terminal 78 and the coupling capacitor 79, they are applied to the grid of tube 68 which is approximately identical to tube 67. This causes the tube 68 to conduct whereupon its plate potential is decreased causing the clamping diode 70 to conduct so that the plate potential of the tube 68 is brought to the predetermined clamping potential of +100 volts. In this case the potential at point "A" goes down to +55 volts as a result of current being drawn from B+ through resistances 84 and 74 in series, and also through the resistance 72. This A.-C. change of −10 volts is transmitted through the capacitor 83 to the grid of tube 75 thereby causing the plate of the latter to go positive by +200 volts which is reflected as an increase of +400 volts at terminal 81 (to 4 kv.+400 v.) and a decrease of −400 volts at terminal 82 (to 4 kv.−400 v.). As a result the beam 50 is deflected upward and scans the red phosphor strips on the tube 20, because the potential on the wires 41 is positive with respect to the potential on the wires 40.

When neither of the tubes 67 and 68 are conducting the potential at the point "A" will be +75 volts because of the voltage-dividing network which includes matrix 71 and the load resistors 84 and 74. This increase in voltage will be transmitted as an increase of +10 volts with respect to the A.-C. axis of the signal applied to the grid of tube 75. This causes the voltage on the plate of tube 75 to decrease by −200 volts which is reflected on the secondary of the transformer 80 as a difference of 800 volts between the terminals 81 and 82, terminal 81 being at 4 kv.−400 v. and terminal 82 being at 4 kv.+400 v. Since terminals 81 and 82 are connected to wires 40 and 41 respectively the beam 50 will be deflected downward and will impinge on a blue emissive phosphor strip.

As a result of the action of the wires 40 and 41 when appropriately energized by the grid switching driving amplifier 45 in conjunction with the action of yoke 19, the beam 50 is caused to scan the beam-intercepting structure of the tube 20 in a pattern such that during each scanning path the beam 50 impinges on only one phosphor strip. The sequence in which the phosphor strips are scanned is random because of the random triggering of the driving amplifier 25 by signals from the pulse generator 46.

Figure 5:
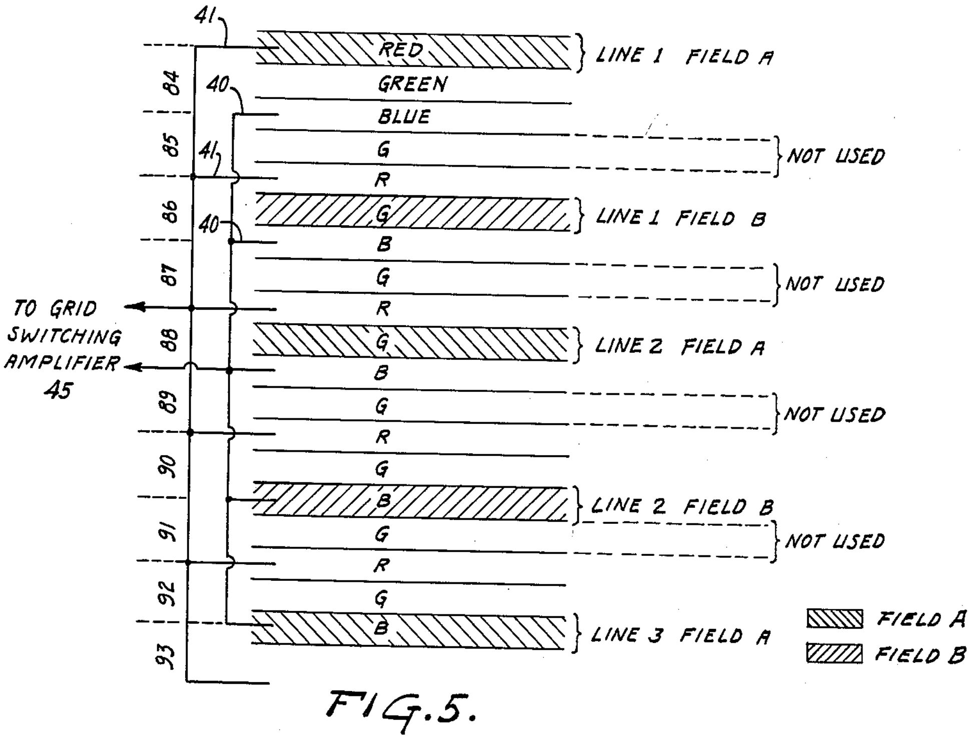
FIGURE 5 is a schematic diagram showing how the fluorescent screen of the tube shown in FIGURE 1 is scanned in a preferred form of our invention.

FIGURE 5 shows the pattern in which the phosphor strips are preferably scanned according to our invention. It is helpful to understand first how the structure 29 of FIG. 1 would be scanned if the picture tube 20 were employed as a conventional line sequential display device. It is assumed, for convenience in explanation that the tube is being used in a mode of operation in which the beam scans only *between* adjacent ones of the wires, i.e., it is not so deflected that it impinges on the wires and simultaneously traverses two adjacent spaces.

Under these circumstances (assuming interlaced scanning, two fields per frame) the beam 50, during the first field, would scan the first line thereof after having passed through the space 84, the second line in space 86, the third line in space 88 and so on. During the next field the intervening spaces 85, 87, and 89 etc., would be scanned in the successive lines thereof. Deflection of the beam over the red, green, or blue phosphor would be by way of the conventional application of deflecting voltages to the two grids of parallel wires 40 and 41.

In a system embodying our invention, however, scanning of the structure 29 is somewhat different because alternate lines of each field are not scanned at all, so that the spaces 86, 90, etc., would not be scanned during the first field and spaces 87 and 91 would not be scanned during the next field. It would therefore be advantageous to reproduce the interlaced lines of the raster so that the lines of one field are disposed at equal distances from the lines of the other field of the same frame.

The apparatus shown in FIG. 1 is therefore constructed to provide for a substantially equally spaced scanning line pattern in which the beam, during the second field, is deflected in the spaces 86, 90, etc., i.e., those spaces which ordinarily would be traversed by the beam during alternate line intervals of the *same* field in conventional line-sequential operation of such a system.

Solely for the sake of explanation it will be assumed in connection with the discussion of FIG. 5 that the first or "A" field consists of only three scanned lines. It is further assumed that the $R-Y$ color difference signal is sampled first, as shown in waveform D of FIG. 2 and that the $G-Y$, $B-Y$ and $G-Y$ signals are successively sampled thereafter. During the first line interval the beam is blanked. During the second line interval corresponding to the unshaded part of waveform H (FIG. 2) the switching amplifier 45 will cause the beam 50 to be deflected upward as it passes through the space 84 so that it impinges upon and scans the red strip as shown.

During the third line interval, as shown by the shaded portion of waveform J, FIG. 2, the beam is blanked (waveform B) while the potential on the grid wires 40 and 41 is being lowered as shown in waveform G of FIG. 2 until the wires 40 and 41 are at the same potential level. During the fourth line interval the beam scans the green emissive strip in the space 88 between the wires 40 and 41. The unshaded portion of the $G-Y$ wave shown in Part J is used during this interval to modulate the intensity of beam 50.

The scanning operation continues similarly during the next two-line scanning interval, i.e., the beam is blanked during the fifth interval corresponding to the shaded portion of the waveform K of the $B-Y$ signal, and is modulated by the latter wave during the sixth line interval corresponding to the unshaded portion thereof. During this sixth line interval the beam is deflected downward, by the potentials on the wires 40 and 41, to scan the blue emissive strip just below the space 92.

In systems in which the tube 20 is operated conventionally the beam, at the beginning of the second or "B" field, would ordinarily be caused to scan the first line thereof in the space 85 between the wires 40 and 41. However, in the present invention, the information in the transmitted signals corresponding to the scan of alternate lines by the pick-up device is not reproduced. Thus the beam 50 is caused instead to scan the cross-hatched green phosphor strip designated "Line 1, Field B."

As the waveform E of FIG. 2 shows, during the fourth consecutive two-line interval in which the first line of the "B" field is assumed to be scanned there will be a pulse 95 supplied from the generator 46 to sampler 33 and to amplifier 45. Pulse 95 causes the switching amplifier 45 to apply zero potential (see waveform G) to the wires 40 and 41, so that the beam 50 is caused to impinge upon the green phosphor strip indicated in FIG. 5. This pulse is also used to sample the $G-Y$ wave in sampler 33 contemporaneously therewith, and the sampled $G-Y$ wave will be used to modulate the intensity of the beam 50.

The second line of field B is produced by the scanning of the beam 50 of a blue emissive phosphor strip when moving in the space 90 as shown, it being assumed that the $B-Y$ signal is being sampled during that interval.

In order to produce the particular type of interlaced scanning shown in FIG. 5, in which the scan of alternate lines in each field is omitted, some of the horizontal synchronizing signals are purposely introduced into the vertical deflection circuit by the capacitive coupling of a capacitor 22 (shown in FIG. 1) which connects the vertical and horizontal windings of the yoke 19. As a result of the introduction of the capacitor 22 the scanning pattern shown in FIG. 5 is obtained.

While the invention has been explained in terms of a raster whose lines are substantially equidistant from one another, it should be understood that other forms of the invention are possible in which the raster lines may not be equally spaced. This may be achieved by omitting the capacitor 22 which couples some of the horizontal deflection signal into the vertical deflection coil. If this is done the beam will scan, during the first field via the spaces 84, 88, 92, etc., and via the spaces 85, 89, 93, etc., during the second field of the same frame. If the screen is viewed at a normal distance, the slight discrepancies in the line spacing will probably not be evident.

The present invention may also be embodied in still another form of apparatus which differs somewhat from the apparatus shown in FIG. 1. For example, the grid 48 of the tube 20 could be driven by signals corresponding to the signals directly produced by the pickup device, i.e., by the red, green and blue representative voltage waves, rather than by adding color difference signals to the luminance signal within the tube 20 itself. In such a case, the luminance signal appearing in the output of the luminance signal channel 12 could be applied to a combining circuit (not shown) to which the color difference signals appearing in the output of the chrominance demodulation circuits 13 would also be applied. The combining circuit would then produce red, green and blue representative voltage waves which could be sampled in samplers similar to samplers 32, 33 and 34. If the red, green and blue representative voltage waves are then sampled in response to the application of pulses having a duration of one line (rather than by pulses having a duration of two lines as shown in waveforms D, E, and F) which occur at half the conventional line scanning frequency it would not be necessary to blank the tube 20 during alternate line scanning intervals. In this alternative arrangement the gated driving amplifier 51 would be omitted and the cathode 47 would be grounded. The grid switching amplifier 45 would operate in the same manner as explained above in connection with FIG. 1 and would be triggered by two of the three sets of the pulses which are used to sample the red, green and blue representative signals.

The invention is also applicable when the tube 20 is scanned in a different fashion, i.e., when the beam scanning paths are transverse to the phosphor strips. In one path the beam will thus be caused to fall only on say, the red phosphor strips, and in another on the blue phosphor strips. As in the operation of systems constructed in accordance with the form of the invention shown in FIG. 1, the potential on the grid wires 40 and 41 will preferably be switched gradually from one level to another at half the conventional line scanning frequency during alternate line intervals, and the modulation of the beam intensity will be coordinated with the variation of potential on the grid.

It should be obvious to those skilled in the art that other variations of the specific embodiment of our present invention shown in FIG. 1 are possible and that we therefore desire that our invention be not limited to the specific disclosure made herein but only by the scope of the appended claims.

We claim:

1. In a cathode ray tube system having a cathode ray tube which contains means for producing an electron beam therein, said tube also containing a beam-intercepting structure having a number of sets of elements, each of which sets exhibits a different characteristic in response to the impingement of electrons thereupon, and further containing a plurality of spaced electrodes interposed between said beam-producing means and said beam-intercepting structure, said tube also having associated therewith means for causing said beam to scan said structure in a plurality of spaced paths; means for energizing said electrodes so that said beam scans only one element in each of said paths, said energizing means also causing said beam to scan said elements in random sequence, and means for modulating the intensity of said beam by signals corresponding to the response characteristic of the element being scanned contemporaneously therewith.

2. A cathode ray tube system comprising: a cathode ray tube containing means for producing an electron beam therein and also containing a beam-intercepting structure having a number of sets of elements, said sets exhibiting respectively different characteristics in response to the impingement of electrons thereupon; means for causing said beam to scan said structure in a plurality of spaced paths; means including a plurality of spaced electrodes interposed between said beam-producing means and said structure for causing said beam to scan said structure so that the characteristic of only one of said sets is exhibited during the scanning of any single path, said last-named means also being constructed to cause said beam to scan said structure such that during successive paths different ones of said characteristics will be exhibited in a random sequence; and means coupled to said last-named means for modulating, in synchronism with the scanning of said structure, the intensity of said beam by signals representative of the characteristic being exhibited contemporaneously therewith.

3. A cathode ray tube system comprising: a cathode ray tube containing means for producing an electron beam therein, a beam-intercepting structure having a number of sets of elements each of which sets exhibits a different characteristic in response to the impingement of electrons thereupon, a plurality of spaced electrodes interposed between said beam-producing means and said structure, means for causing said beam to scan said structure in a plurality of spaced and substantially parallel paths, means coupled to said electrodes for causing said beam to scan only one of said elements in each of said paths, said last-named means also causing said beam to scan elements exhibiting different ones of said characteristics in substantially random sequence in successive paths, and means coupled to said last-named means for modulating the intensity of said beam in synchronism with the scanning of said elements by signals corresponding to the response characteristic of the element being scanned.

4. A cathode ray tube system comprising: a cathode ray tube having means for producing an electron beam therein, said tube also having a beam-intercepting structure and a plurality of spaced electrodes interposed between said beam-producing means and said structure, said structure including a plurality of sets of fluorescent elements each set of which is constructed to generate light of a different color in response to the impingement of electrons thereupon, means for causing said beam to scan said structure in a plurality of substantially parallel spaced paths, means for energizing said electrodes so that as said beam is scanned in each of said paths it impinges substantially only on one element, said energizing means being so constructed and cooperating with said electrodes in a manner such that the elements impinged upon in successive paths are selected in random sequence from said plurality of sets, and means for modulating the intensity of said beam by signals representative of the color of the element being scanned.

5. Apparatus for receiving signals containing regularly recurrent portions representative of a given form of intelligence, each of said portions having a plurality of signal components which respectively correspond to the magnitude of selected attributes of said intelligence, said system comprising: a cathode ray tube which includes means for producing an electron beam therein, and a beam-intercepting structure having a plurality of sets of elements, said sets respectively exhibiting characteristics corresponding to said selected attributes in response to the impingement of electrons thereupon; means for modulating the intensity of said beam by different ones of said signal components in random sequence during the intervals in which alternate portions of said signals occur; and means for causing said beam to scan on said beam-intercepting structure in a plurality of spaced paths, said scanning means being constructed so as to cause said beam to impinge in the course of each path substantially on only one element which exhibits the characteristic response corresponding to the selected attribute of which the modulating signal component is contemporaneously representative.

6. A system for receiving television signals containing regularly recurrent portions representative of the pictorial information of televised scenes, each of said portions having a plurality of signal components which respectively correspond to the magnitude of selected attributes of said scenes, said system comprising: a cathode ray tube which includes means for producing an electron beam therein and a beam-intercepting structure having a plurality of sets of elements, said sets respectively exhibiting characteristics corresponding to said selected attributes in response to the impingement of electrons thereupon; means for modulating the intensity of said beam with selected ones of said signal components during the intervals in which alternate portions of said television signals occur, said modulating means being constructed and arranged so that the said beam-modulating signal components occur in random sequence; and means for causing said beam to scan said beam-intercepting structure in a plurality of spaced paths, said scanning means being constructed so as to cause said beam to impinge, in the course of each path, substantially only on one element exhibiting a response characteristic corresponding to the selected attribute of which the beam-modulating signal component is contemporaneously representative.

7. Apparatus according to claim 6 wherein means are provided for causing the paths scanned by the beam in each field to be interlaced with the paths scanned in the next field, said interlaced scanning paths being substantially equidistant from one another.

8. A system for receiving television signals containing regularly recurrent portions representative of the pictorial information of the televised scenes, each of said portions having a plurality of signal components which respectively correspond to the magnitude of selected colors in said scenes, said system comprising: a cathode ray tube which includes means for producing an electron beam therein, and a beam-intercepting structure having a plurality of sets of elements, said sets respectively emitting light corresponding to said selected colors in response to the impingement of electrons thereupon; means for modulating the intensity of said beam by different ones of said signal components in random sequence during intervals in which alternate portions of said television signals occur, and means for causing said beam to scan said beam-intercepting structure in a plurality of spaced paths, said scanning means further being constructed so as to cause said beam to impinge in the course of each path substantially only on one of said elements, said impinged-upon element thereupon emitting light of a color corresponding to the color represented by the signal component used to modulate the beam intensity contemporaneously therewith.

9. In a system for receiving color television signals containing regularly recurrent portions representative of the pictorial information of televised scenes, each of said portions having a plurality of signal components which respectively correspond to the magnitude of selected colors of said scenes, said system further including a cathode ray tube having means for producing an electron beam therein and a beam-intercepting structure having a plurality of sets of elements, said sets respectively emitting light corresponding to the said selected colors in response to the impingement of electrons thereupon: means for modulating the intensity of said electron beam by different ones of said signal components during the intervals in which alternate portions of said signals occur, said modulating means being constructed and arranged so that the signal components used to modulate said beam occur in random sequence, and means for causing said beam to scan on said beam intercepting structure in a plurality of spaced paths, said scanning means causing said beam to impinge in the course of each of said paths substantially only on one element which thereupon emits light of a color of which the signal used to modulate said beam contemporaneously therewith is representative.

10. In a system for receiving color television signals containing regularly recurrent portions representative of pictorial portions of the televised scene, each of said portions having a plurality of signal components which respectively correspond to the magnitude of different selected colors of said scenes, said system further containing a cathode ray tube having means for producing an electron beam therein, a beam-intercepting structure having a plurality of sets of fluorescent elements which respectively emit light of different colors corresponding to the said colors in response to the impingement of electrons thereupon, and a plurality of essentially parallel spaced electrodes intermediate said beam producing means and said beam intercepting means; means for sampling different ones of said signal components in random sequence during intervals in which alternate ones of said recurrent signal portions occur, means for applying said sampled signal components to control the intensity of said electron beam, and means coupled to said sampling means and to said plurality of electrodes for supplying varying potentials to said plurality of electrodes in step with the sampling of said signal components for causing said beam to impinge during said alternate signal portion intervals only on elements of said structure which emit light of the color of which the sampled signal component which modulates the beam contemporaneously therewith is representative, said varying potential supplying means also being constructed so as gradually to change, in the intervening intervals between successive ones of said alternate signal portion intervals, the potential on said electrode from a level which obtained during the previous alternate signal portion interval to the level which is to obtain in the next succeeding alternate signal portion interval.

11. In a color television receiver: a color picture tube having means for producing an electron beam, means for controlling the intensity of said beam, a focusing and switching grille comprising two sets of mutually insulated conductors, and an image-reproducing screen comprising a plurality of regions each having three different areas respectively responsive to impingement by said beam to produce light of three different colors; means for causing said beam to scan successive regions of said screen through the interstices between said conductors; means for applying between said sets of conductors in random sequence during said scansion potential differences of three different values to cause said beam to impinge in random sequence on the different ones of said three areas; and means for supplying to said intensity-controlling means a signal representative of that particular color component of the image to be reproduced which is produced by the contemporaneously scanned one of said areas.

12. A color television receiver according to claim 11, wherein said means for causing said beam to scan said screen comprise means for scanning said beam at a predetermined horizontal line scanning rate and said means for applying sequentially said potential differences comprise means for applying them at a rate equal to one-half said horizontal line scanning rate.

13. A receiver according to claim 12, wherein each of said potential differences is applied between said sets of conductors for a period up to the reciprocal of one-half said horizontal line scanning rate.

14. In an image-reproducing system having a cathode ray tube comprising means for producing an electron beam and a beam intercepting structure, said beam intersecting structure having at least three different areas respectively responsive to impingement by said electron beam to produce three different kinds of light: means for deflecting said beam so as to scan different ones of said areas during successive time intervals, the area scanned during any given interval being selected at random from those of said areas different from that scanned during the preceding interval, and means for modulating the intensity of said beam with a signal representative of that component of said image which is composed of the kind of light produced by the contemporaneously scanned one of said areas.

15. Apparatus according to claim 11 characterized in that said means for applying said different-valued potential differences comprises a plurality of electron discharge devices each having a cathode, a control electrode and an anode, said anodes being connected to a first point of first fixed potential, a plurality of voltage-dividing networks each coupled between the anode of one of said discharge devices and the control electrodes of the others and each also coupled to a second point which is normally at a second fixed potential, said networks having such constants that only one of said devices at a time conducts when said second point is at said second fixed potential, means for raising the potential of said second point periodically above said second fixed value by an amount sufficient to cut off all of said discharge devices, a plurality of parallel resistance-capacitance circuits coupled respectively between different ones of said cathodes and a third point of fixed potential, said resistance-capacitance circuits having such constants that the one of said devices which conducts during a given period during which said second point is at said second fixed potential is maintained cut-off during the next period during which said point is at said potential, and means responsive to the conduction of different ones of said devices to produce said different valued potential differences.

16. Apparatus according to claim 15 further characterized in that said conduction responsive means comprises means for deriving a first signal indicative of the conduction of one of said electron discharge devices and a second signal indicative of the conduction of another of said devices, first and second electron discharge devices each having an input and an output circuit, means for applying said first derived signal to the input circuit of said first device and said second derived signal to the input circuit of said second device, said first and second devices being constructed and arranged so as to become conductive in response to the application of said signals to their respective input circuits, first and second clamping means for clamping the respective output circuits of said first and second devices to different voltage levels during conduction of said respective devices, said clamping means being both coupled to a point at a fixed voltage level different from both said different levels, a matrix unit coupled to said last-named point, to said clamping means and to said output circuits of said first and second discharge devices, said matrix unit including a plurality of resistive elements having a common junction, a third electron discharge device having an input circuit coupled capacitively to said common junction, and a transformer coupled to the output circuit of said third electron discharge device, said transformer having a secondary winding across which said different valued potential differences are produced.

References Cited in the file of this patent

UNITED STATES PATENTS

| | | |
|---|---|---|
| 2,734,134 | Beard | Feb. 7, 1956 |
| 2,767,315 | Kosten | Oct. 16, 1956 |
| 2,863,939 | Jones | Dec. 9, 1958 |